(12) United States Patent
Hino

(10) Patent No.: US 6,473,521 B1
(45) Date of Patent: Oct. 29, 2002

(54) IMAGE PROCESSING DEVICE AND IMAGE PROCESSING METHOD AND STORAGE MEDIUM

(75) Inventor: Yasuhiro Hino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/320,566

(22) Filed: May 27, 1999

(30) Foreign Application Priority Data

May 29, 1998 (JP) .......................................... 10-150389
May 21, 1999 (JP) .......................................... 11-142423

(51) Int. Cl.$^7$ ................................................ G06K 9/00
(52) U.S. Cl. ...................... 382/164; 358/453; 358/455; 358/515; 358/540
(58) Field of Search ................................ 358/461, 458, 358/521, 1.9, 534, 538, 540, 515, 455, 453; 382/162, 164, 169, 167, 274

(56) References Cited

U.S. PATENT DOCUMENTS

| | | | | |
|---|---|---|---|---|
| 4,734,784 | * | 3/1988 | Tanaka ........................ | 358/283 |
| 4,797,943 | * | 1/1989 | Murayama et al. ........... | 382/54 |
| 5,400,053 | * | 3/1995 | Johary et al. ................ | 345/147 |
| 5,576,847 | * | 11/1996 | Sekine et al. | |
| 5,727,137 | * | 3/1998 | Leclair et al. ............... | 375/116 |
| 5,898,819 | * | 4/1999 | Austin et al. ................ | 395/109 |
| 6,002,448 | * | 12/1999 | Hanai .......................... | 348/630 |
| 6,160,912 | * | 12/2000 | Usami ......................... | 382/167 |
| 6,204,873 | * | 3/2001 | Shimazaki ................... | 347/172 |
| 6,243,174 | * | 6/2001 | Fukasawa .................... | 358/530 |

OTHER PUBLICATIONS

Gonalez, Rafael and Woods, Richard; Digital image processing; 1992;Addison–Wesley Publishing company, Inc.; pp. 173–180.*

* cited by examiner

*Primary Examiner*—Joseph Mancuso
*Assistant Examiner*—Anand Bhatnagar
(74) *Attorney, Agent, or Firm*—Fitzpatrick, Cella, Harper & Scinto

(57) ABSTRACT

Color data, originally corresponding to different colors, are converted to the same density when gray-scale conversion is performed, and no boundary is distinguished. When performing the gray-scale conversion, color data of an object adjacent to an object to be processed is referred to. As a result of such reference, even if it is detected that the object to be processed and the object adjacent to the object to be processed have different colors, but are converted to the same density by the gray-scale conversion, the gray-scale conversion is performed in such a manner that the boundary between the objects can be identified.

21 Claims, 18 Drawing Sheets

IMAGE PROCESSING DEVICE AND IMAGE PROCESSING METHOD AND STORAGE MEDIUM

BACKGROUND OF THE INVENTION

1. Field of the Invention

The present invention relates to an image processing device and method, and a storage medium in which color images are gray-scale converted.

2. Related Background Art

In an ordinary printing apparatus, to emit a monochromatic output of color designation such as RGB system, after density is converted from RGB system to a gray scale, a dither method or another binarizing method is generally used to output a pseudo gradation. Generally, the following equation is used as a conversion equation from RGB system to gray-scale density:

$$\text{Gray}=1000-(290\times R+605\times G+105\times B)/1000$$

In the aforementioned prior art, however, in the RGB system, there is a case where even different colors have the same density by density conversion.

In a printing apparatus in which each RGB color data of 0 to 1000 can be represented up to monochromatic 1000 gradations by the pseudo gradation, when the density conversion is performed in accordance with the above conversion equation, for example, density (R, G, B)=(500, 0, 100) results in:

$$\text{Gray}=1000-(290\times 500+605\times 0+105\times 100)/1000=845$$

Moreover, density (R, G, B)=(400, 48, 100) results in:

$$\text{Gray}=1000-(290\times 400+605\times 48+105\times 100)/1000=845$$

These two colors are converted to the same density.

Therefore, in such case, two colors are outputted at the same density during the monochromatic output, and color difference cannot be distinguished. Especially, when drawing is performed in such a manner that two colors are partially overlapped or allowed to abut on each other, the boundary line of two colors disappears. This causes a problem that the color output result and monochromatic output result look completely different from each other.

SUMMARY OF THE INVENTION

An object of the present invention is to solve the aforementioned problems.

The present invention has been developed in consideration of the above-mentioned prior art, and an object thereof is to provide an image processing device and method and a storage medium, in which when figures having different colors and the same density are adjacent to one another, a user can recognize these figures.

To attain this and other objects, according to a preferred aspect of the present invention, there is provided an image processing device, comprising: processing means for obtaining color data and gray-scale converted value of a processing object and color data and gray-scale converted value of another processing object adjacent to said processing object; first determining means for determining whether the gray-scale converted value of said processing object is similar to the gray-scale converted value of the processing object adjacent to said processing object; second determining means for determining whether the color data of said processing object is different from the color data of the processing object adjacent to said processing object; and control means for, when said first, second determining means determines that the color data are different and gray scales are similar to each other, control is performed to generate a difference in the gray-scale converted values of said processing object and the processing object adjacent to said processing object.

Another object of the present invention is to provide an inventive function.

Details and other characteristics of the present invention will be apparent from the following embodiments and drawings.

DETAILED DESCRIPTION OF THE PREFERRED EMBODIMENTS

Embodiments of the present invention will be described in detail hereinafter with reference to the drawings.

First Embodiment

Before describing a constitution of the embodiment, a constitution of a laser beam printer (hereinafter referred to as LBP) to which the embodiment is preferably applied will be described with reference to FIG. 1. Additionally, the printer to which the embodiment is applied is not limited to the laser beam printer and, needless to say, may be a printer of another printing system.

Figure 1:
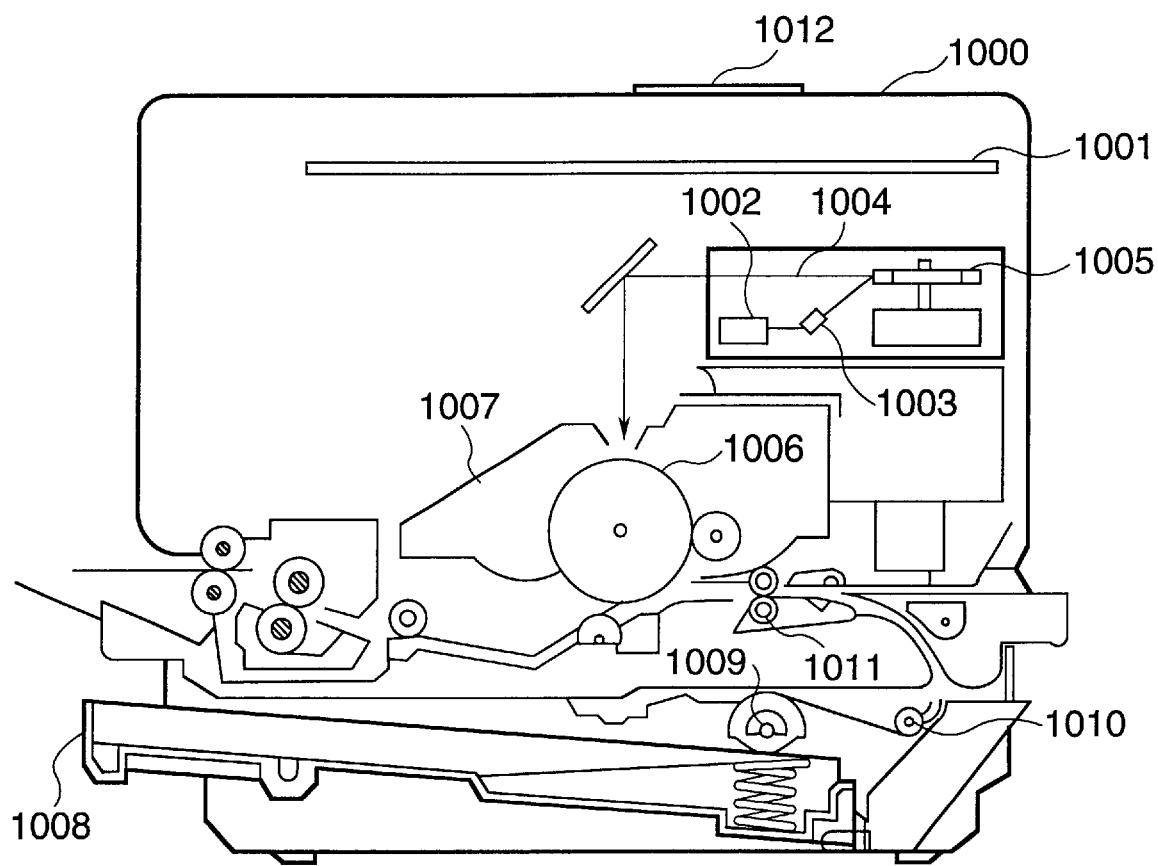
FIG. 1 is a sectional side view showing a structure of a laser beam printer to which the present invention can be applied.

FIG. 1 is a sectional view showing an inner constitution of the laser beam printer to which the embodiment is applied. In the LBP, character patterns, form data and the like can be registered from a data source (not shown). In FIG. 1, numeral 1000 denotes LBP unit in which character information (character codes), form information, macro commands and the like supplied from a host computer connected to the outside are inputted and stored, and corresponding character patterns, form patterns and the like are prepared in accordance with the information to form an image on a recording medium or sheet.

Numeral 1012 denotes an operation panel or console unit on which operating switches, LED displays and the like are arranged, and 1001 denotes a printer control unit for controlling the entire LBP unit 1000 and analyzing the character information and the like supplied from the host computer. The control unit 1001 mainly converts the character information into video signals of the corresponding character patterns to transmit outputs to a laser driver 1002. The laser driver 1002 is a circuit for operating a semiconductor laser 1003 to turn on/off a laser beam 1004 emitted from the semiconductor laser 1003 in response to inputted video signals.

The laser beam 1004 is swung in a horizontal direction by a rotating polygonal mirror 1005 to scan on an electrostatic drum 1006. Thereby, an electrostatic latent image of the character pattern is formed on the electrostatic drum 1006. The latent image is developed by a developing unit 1007 in the periphery of the electrostatic drum 1006, then transferred to a recording sheet. A cut sheet is used in the recording sheet, and the cut recording sheet is stored in a sheet cassette 1008 mounted on the LBP unit 1000, taken into the device via a sheet supply roller 1009 and feeding rollers 1010, 1011, and supplied to the electrostatic drum 1006.

Figure 2:
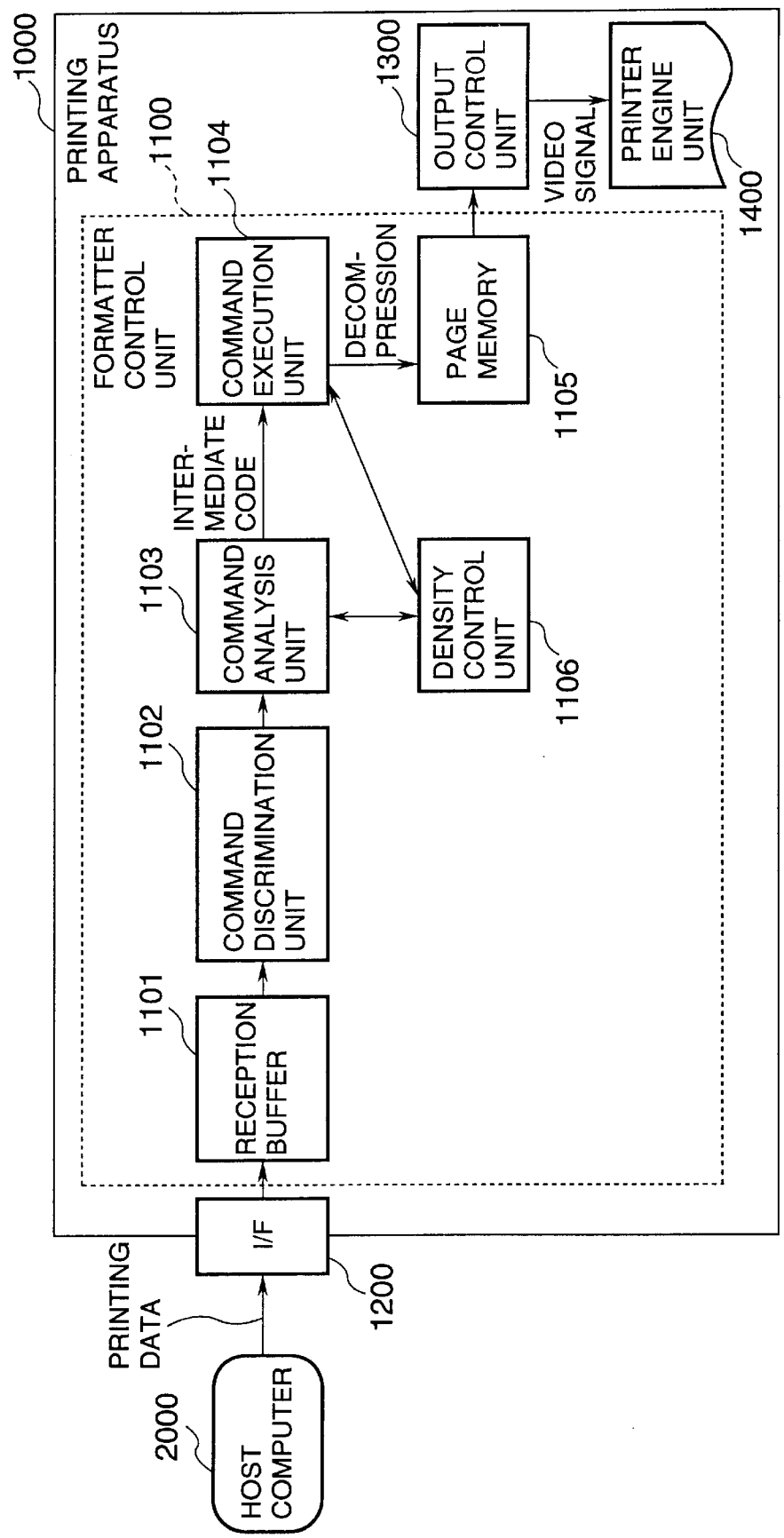
FIG. 2 is a block diagram showing a functional constitution of the printing apparatus of FIG. 1.

FIG. 2 is a block diagram showing a functional constitution of the printing apparatus of FIG. 1. In FIG. 2 numeral 2000 denotes a host computer connected to the printing apparatus 1000, which transmits printing information comprising printing data and control codes to the printing apparatus 1000. The printing apparatus 1000 is mainly constituted of a formatter control unit 1100, interface 1200, output control unit 1300, and printer engine unit 1400.

The formatter control unit 1100 comprises a reception buffer 1101, command discrimination unit 1102, command analysis unit 1103, command execution unit 1104, page memory 1105, and density control unit 1106. The reception buffer 1101 is memory means for temporarily holding the printing information received from the host computer 2000. The command discrimination unit 1102 discriminates each printing control command, and the printing data is analyzed in the command analysis unit 1103 in response to each command. The command analysis unit 1103 analyzes each printing control command.

The command analyzed by the command analysis unit 1103 is converted to an intermediate code indicative of an intermediate result obtained by analyzing the printing data. In the command discrimination unit 1102, when the printing control command is discriminated as a command accompanied with decompression into a figure, diagram or another intermediate code, color attribute is controlled in the density control unit 1106.

The density control unit 1106 converts a designated color to density, and refers to its peripheral color to finely adjust the density and obtain an optimum density. In the command execution unit 1104, each command is executed by the intermediate code, and the command relating to drawing and printing is successively decompressed to the page memory 1105.

Additionally, the formatter control unit 1100 generally comprises a computer system using CPU, ROM, RAM and the like. The output control unit 1300 converts the content of the page memory 1105 into a video signal to transfer the image to the printer engine unit 1400. The printer engine unit 1400 is a printing mechanism unit for permanently forming a visible image from the received video signal on the recording sheet as shown in FIG. 1.

Figure 3:
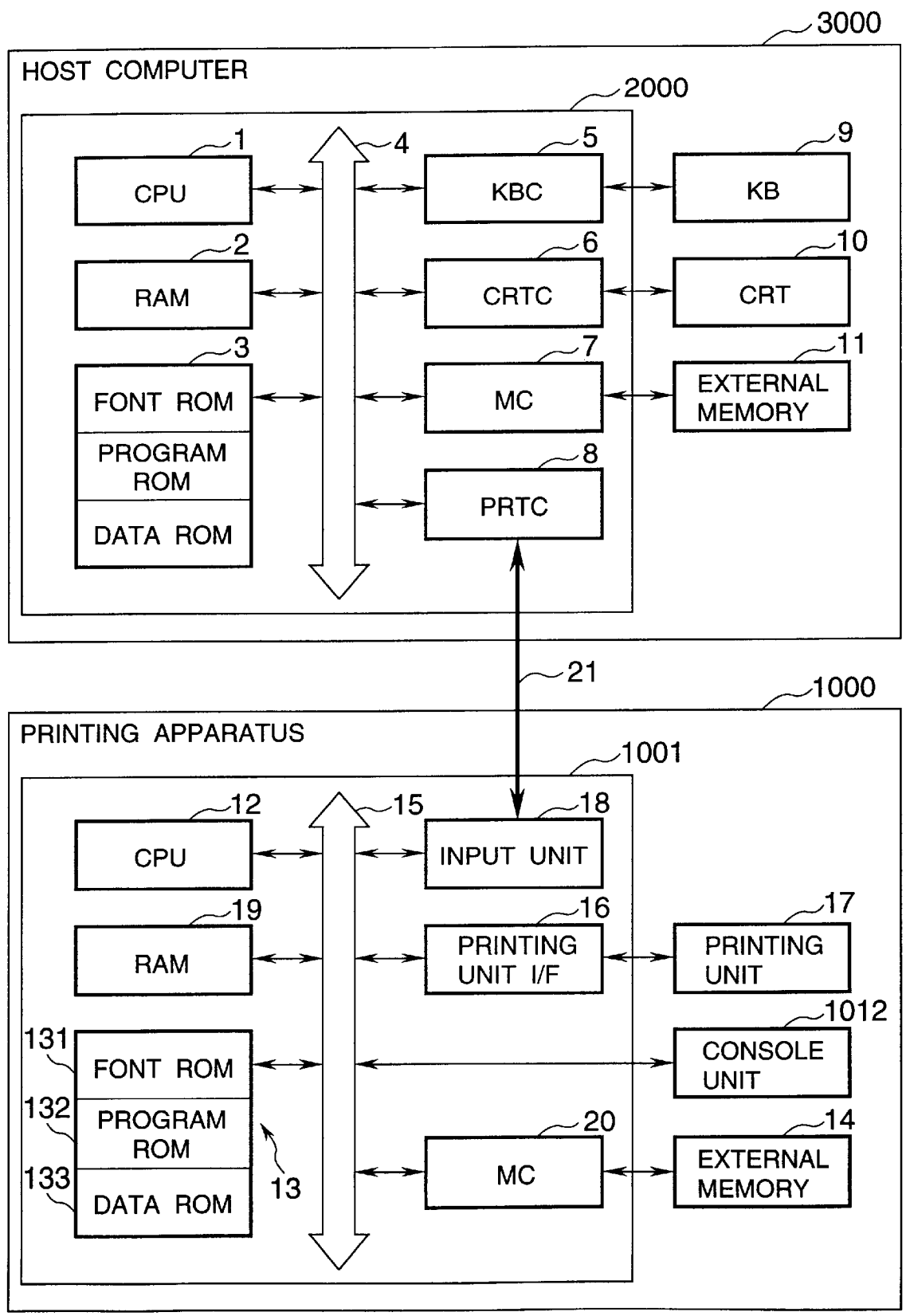
FIG. 3 is a block diagram showing a constitution of a printer control system using the printing apparatus of FIG. 1.

FIG. 3 is a block diagram showing a concrete constitutional example of a printer control system. Here, the laser beam printer (FIG. 1) will illustratively be described. Additionally, as long as the function of the present embodiment is executed, needless to say, even a single apparatus, system comprising a plurality of apparatuses, and system in which a processing is performed via LAN or another network can be applied.

In FIG. 3, numeral 3000 denotes a host computer, which comprises CPU 1 for executing a processing of document in which diagrams, images, characters, and tables (including spreadsheets and the like) are mixed based on a document processing program stored in program ROM of ROM 3. For each device connected to a system device 4, control programs and the like of CPU 1 are stored. Font data and the like for use in the document processing are stored in font ROM of ROM 3, and various data for use in the document processing are stored in data ROM of ROM 3. Numeral 2 denotes RAM, which functions as a main memory of CPU 1, working area and the like.

Numeral 5 denotes a keyboard controller (KBC) to control key inputs from a keyboard 9 and pointing device (not shown). CRT controller (CRTC) 6 controls display on CRT display (CRT) 10. A memory controller (MC) 7 controls an access with a hard disc (HD), floppy disc (FD) or another external memory 11 in which boot programs, various applications, font data, user files, edition files and the like are stored.

A printer controller (PRTC) 8 is connected to the printer 1000 via a predetermined bi-directional interface 21 to execute a control processing of communication with the printer 1000. Additionally, CPU 1 executes a rasterizing processing of outline font to display information RAM set, for example, on RAM 2 to allow WYSIWYG (What You See Is What You Get) on CRT 10.

Moreover, CPU 1 opens various windows registered based on commands indicated with a mouse cursor (not shown) on CRT 10 to execute various data processings. In the printer 1000, a printer CPU 12 generally controls an access with various devices connected to a system bus 15 based on a control program stored in a program ROM 132 of ROM 13 or a control program stored in an external memory 14, and transmits output information or image signal to a printing unit or printer engine 17 connected via a printing unit I/F 16.

Moreover, a control program of CPU 12 as shown in a flowchart of the first embodiment may be stored in the program ROM 132 of ROM 13. Font data for use in generating the output information are stored in a font ROM 131 of ROM 13, while information for use on the host computer are stored in a data ROM 133 of ROM 13 in a printer having no hard disc or another external memory 14.

The CPU 12 can perform a communication processing with the host computer 3000 via an input unit 18, and the information in the printer can be transmitted to the host computer 3000. RAM 19 functions as a main memory, working area and the like of CPU 12, and its memory capacity can be expanded by an optional RAM connected to an expansion port (not shown).

Additionally, RAM 19 is used in an output information decompression area, environmental data storage area, NVRAM (non-volatile memory) and the like. The access to the aforementioned hard disc (HD), IC card or another external memory 14 is controlled by a memory controller (MC) 20. The external memory 14 is optionally connected to store the font data, emulation program, form data and the like. Moreover, numeral 18 denotes the above-mentioned operation panel on which operating switches, LED displays and the like are arranged.

Moreover, the external memory is not limited to one, and at least one or more memories are provided. Specifically, a plurality of external memories may be connected to store built-in fonts, optional font cards, and programs for interpreting different printer control languages. Furthermore, a non-volatile memory NVRAM (not shown) may be provided to store printer mode setting information from the console unit 1012.

The entire printing control processing procedure executed in the printing apparatus constituted as described above will next be described with reference to flowcharts of FIGS. 4 to 6. Processing steps are shown in S401 to S404 in FIG. 4, S501 to S508 in FIG. 5, and S601 to S609 in FIG. 6. A program defining these processings is stored in the program ROM, and executed by the CPU 12.

Figure 4:
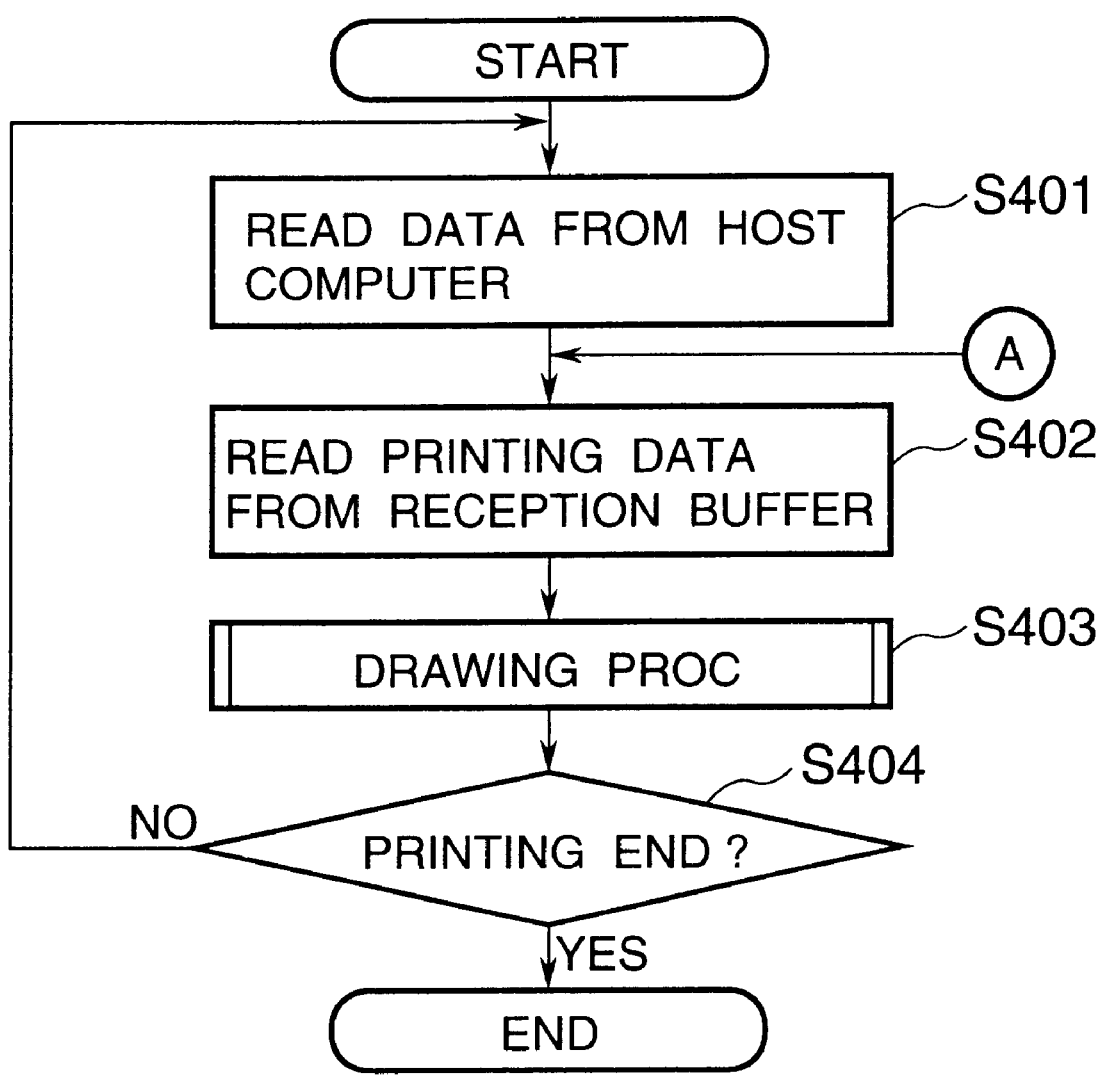
FIG. 4 is a flowchart showing a printing control procedure of a first embodiment.

FIG. 4 shows a main processing from the start till the end of the operation of the printing apparatus 1000. First at step S401 the printing data transmitted from the host computer 2000 is read, and stocked in the reception buffer 1101. Subsequently at step S402 the printing data stocked in the reception buffer is read, and at step S403 a drawing processing is performed. Thereafter, it is judged at step S404 whether or not a printing end command is received, or whether or not the printing data ends. When the printing ends, the printing operation is completed. If the printing does not end, the processing is repeated from the step S401.

Figure 5:
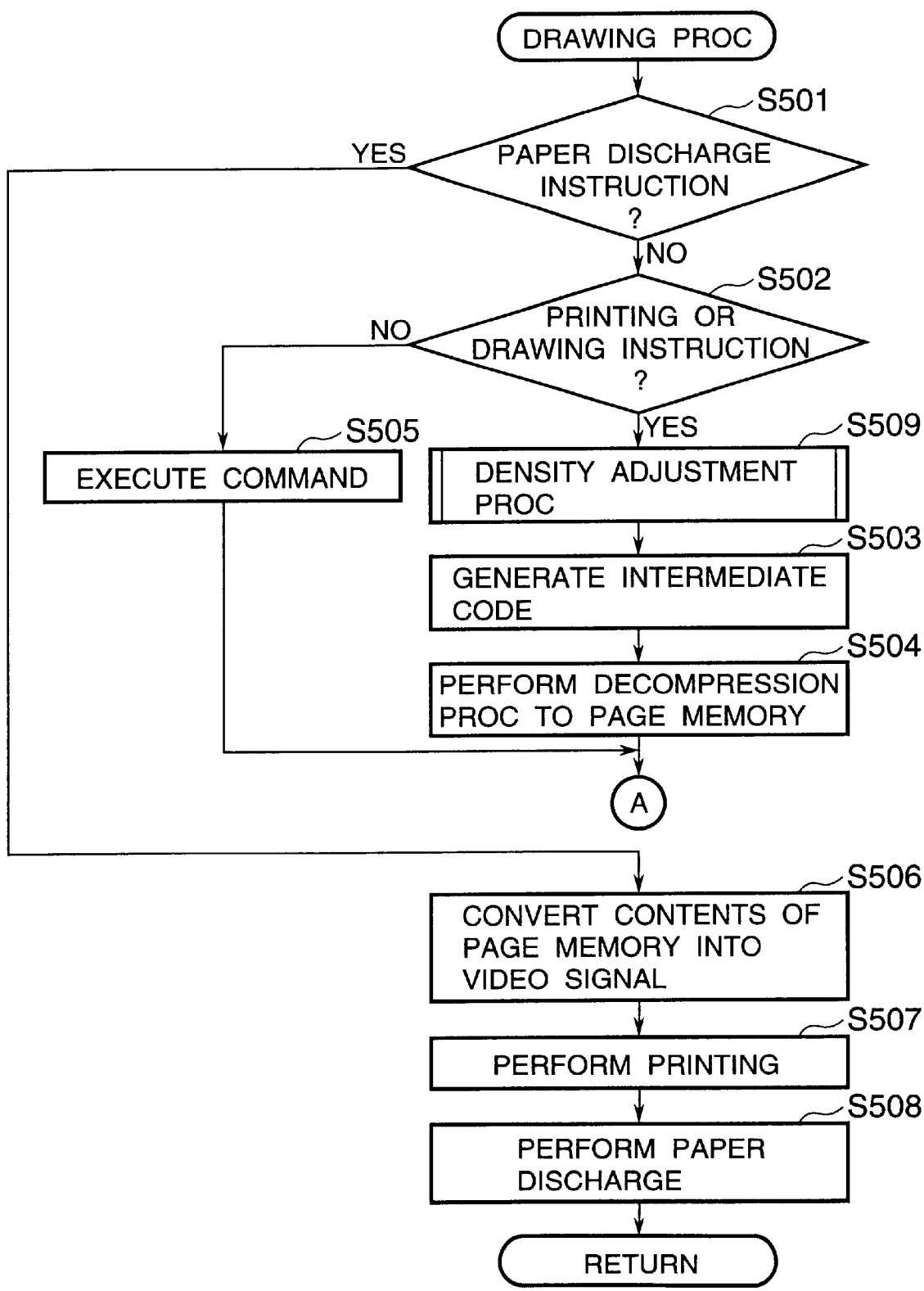
FIG. 5 is a flowchart showing a procedure of density adjustment processing shown in FIG. 4.

FIG. 5 shows details of the drawing processing corresponding to the step S403 of FIG. 4. In the processing, a printing processing is actually performed. First at step S501, it is checked by the command analysis unit 1103 whether data indicates a paper discharge instruction. In response to the paper discharge instruction,. the processing advances to step S506. Moreover, when there is no paper discharge instruction in step S501, it is next determined whether the analyzed command indicates a printing or drawing instruction or another command for a depression processing to the page memory (step S502). If not, the processing advances to step S505 to immediately execute the command.

When the processing advances to step S509 from S502, a density adjustment processing is performed. Subsequently, the processing advances to step S503 to generate an intermediate code in a form facilitating a command execution processing. Upon receipt of the intermediate code, the command execution unit 1104 performs the decompression processing to the page memory 1105 (step S504). After the decompression is completed, the processing returns to the step S402 of FIG. 4 to repeat the data analysis processing.

When the paper discharge instruction is judged in the step S501, the output control unit 1300 converts contents of the page memory 1105 into a video signal for the printer engine unit 1400 to transfer/output an image (step S506). The printer engine unit 1400 forms the received video signal to a permanent visible image on a recording sheet to perform printing (step S507). For a printed result, at step S508 paper discharge is performed, thereby completing the printing control processing per page.

Figure 6:
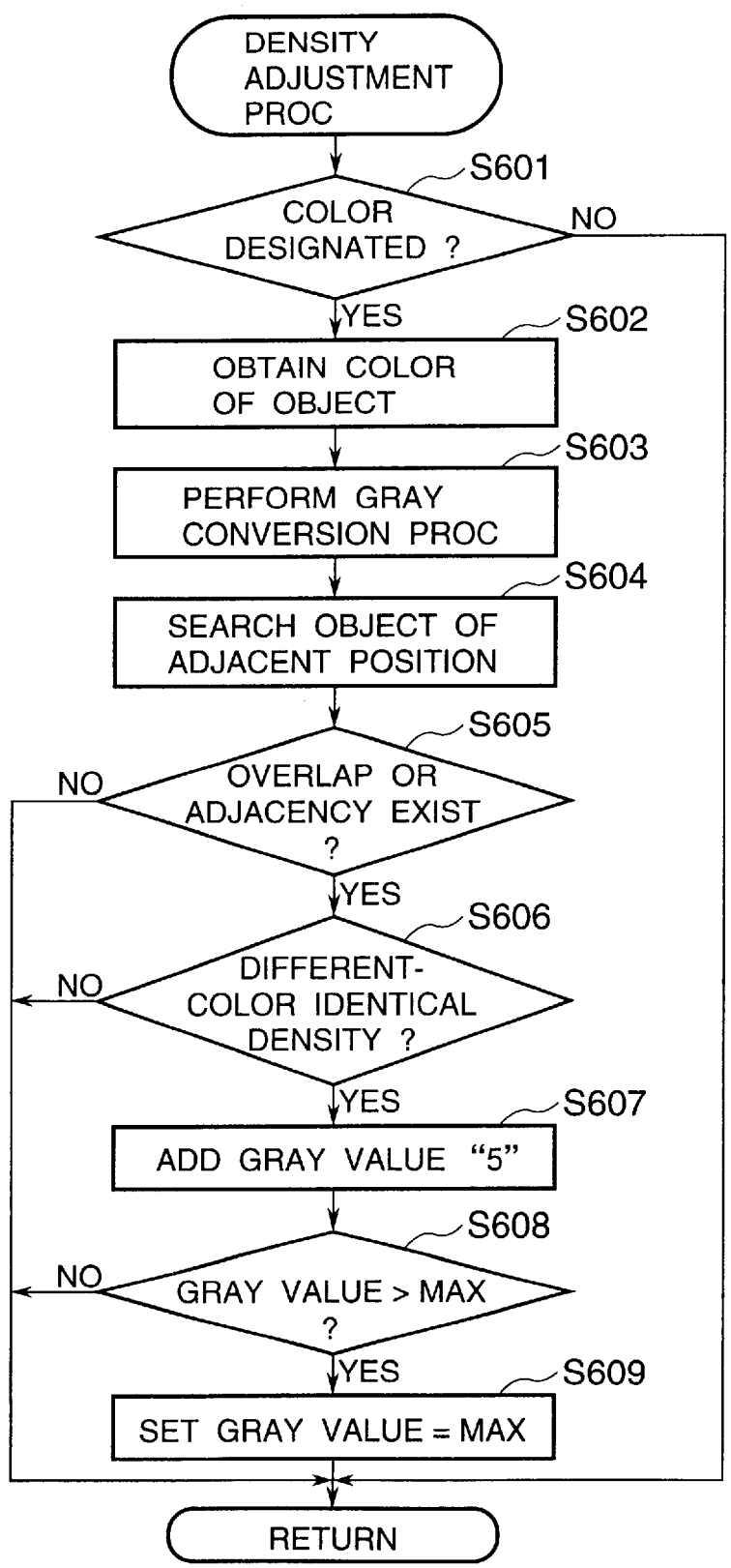
FIG. 6 is a flowchart showing a procedure of density adjustment processing shown in FIG. 5.

FIG. 6 shows the density adjustment processing for use in FIG. 5. In the processing a color designated in RGB system is converted to a gray density.

First it is judged at step S601 whether or not color of a printing object is designated. When the color is not designated, the processing is completed as it is. In this case, an initial value or black (density of 100%) is selected as it is. When the color is designated at the step S601, the designated color of the printing object is obtained at step S602, and gray conversion processing is performed at step S603. The conversion to the gray scale is identified/determined, for example, by the following equation.

$$Gray=1000-(290\times R+605\times G+105\times B)/1000$$

Subsequently, in step S604, an object in a position adjacent to the object being processed is searched. The object means a diagram constituted of the intermediate code (including characters and the like), and will be detailed later. A drawing position, outline coordinate point, width/height and the like are described in the object, and the adjacent object can be detected from these information.

Subsequently, it is determined in step S605 whether or not an overlap or adjacency exists in each of the objects of the adjacent position searched in the step S604. When there is any overlap or adjacency, it is further determined in step S606 whether or not it has a different-color identical density (i.e., colors are different but converted to the identical density). This can be achieved by distinguishing two conditions that two RGB values are different and that the converted gray values agree with each other. For the different-color identical density, the gray value."5" after the conversion is added. In this case, if the maximum value (i.e., black) is exceeded, in step 8609 the gray value is set to maximum, thereby ending the processing.

On the other hand, when there is no overlap or adjacency in step S605, there is no object with the different-color identical density in step S606 and when the gray value is equal to or less than the maximum value in step S608, the processing is ended as it is.

Figure 7:
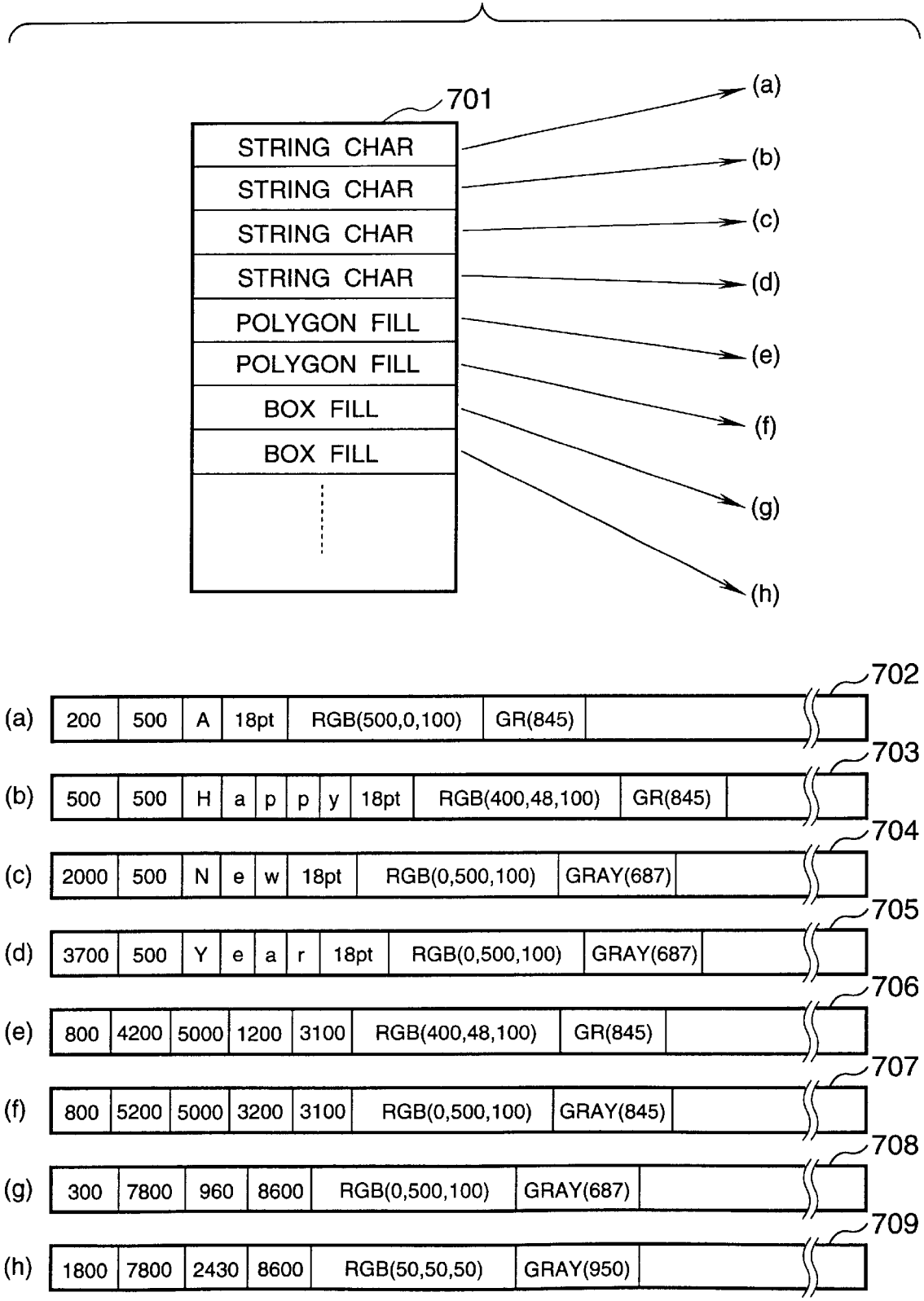
FIG. 7 is an explanatory view showing a constitution example of an object.

Here, the above-mentioned object will be described with reference to FIG. 7. In FIG. 7, the objects on the same page are managed by an object management table 701. In the table 701, a character string (string char), polygon (polygon fill), rectangle (box fill) and other types are described, which are linked to tables (a) to (h), respectively. Tables (a) to (h) are linked to objects 702 to 709 in each of which a drawing position, size, outline and another attribute are described. As such information, the color designated in RGB system, and density value after the gray conversion are described. Numerals 702 to 709 denote intermediate codes after the command analysis, which are each called the object.

For example, 702 has a color designation of RGB=(500, 0, 100), gray value=845, which indicates that character string "A" is printed in drawing position (X, Y)=(200, 500) with a size of 18 point.

Moreover, 703 has a color designation of RGB=(400, 48, 100), gray value=845, which indicates that character string "HAPPY" is printed in drawing position (X, Y)=(500, 500) with a size of 18 point.

Therefore, the objects 702 and 703 have different-color identical density. However, since they overlap with each other because of their drawing positions and sizes and no adjacency exists, in the embodiment, the density adjustment (S607 of FIG. 6) is not performed.

Figure 8A:
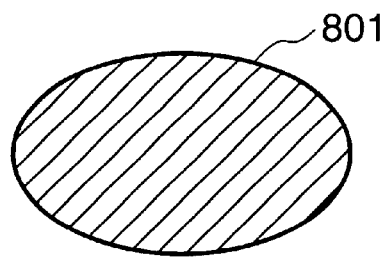
FIGS. 8A, 8B, 8C and 8D are schematic views diagrammatically showing output results before and after density adjustment according to the first embodiment.
Figure 8B:
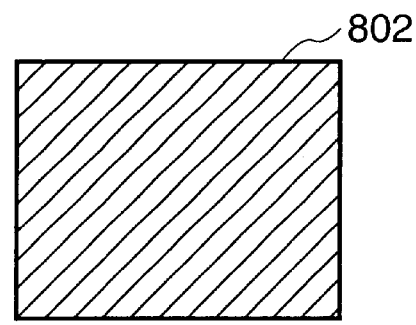

Concrete examples of printed results in the embodiment will next be described with reference to FIGS. 8A to 8D. FIGS. 8A, 8B show an ellipse 801 and rectangle 802, respectively, in which the objects having different-color identical density are printed.

Figure 8C:
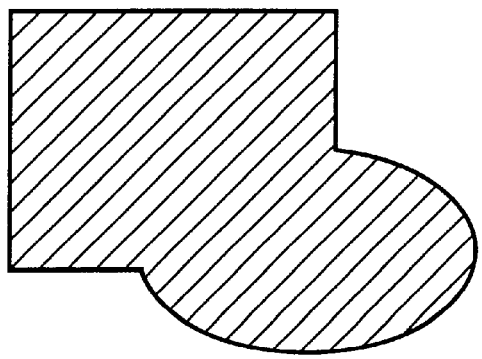
Figure 8D:
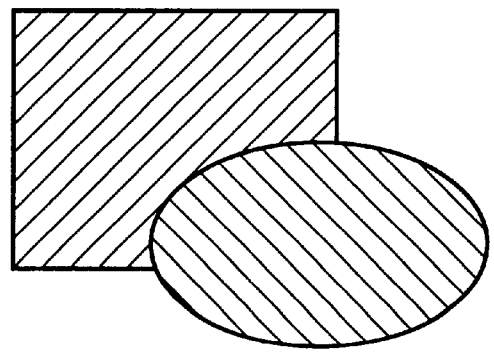

FIGS. 8C, 8D show printed results when 801 and 802 overlap with each other. FIG. 8C shows a conventional printed example, while FIG. 8D shows a printed example according to the embodiment. In FIG. 8C, the ellipse and rectangle have no boundary line and look like one figure, but in FIG. 8D the two figures can clearly be distinguished because of a density difference.

In the example, the gray-scale converted value of the entire ellipse is varied, but the boundary line of the elliptical and rectangular figures may explicitly be shown with a different color. In this case, the outline of the entire ellipse is formed with a different color to explicitly show the boundary line.

Second Embodiment

Figure 9:
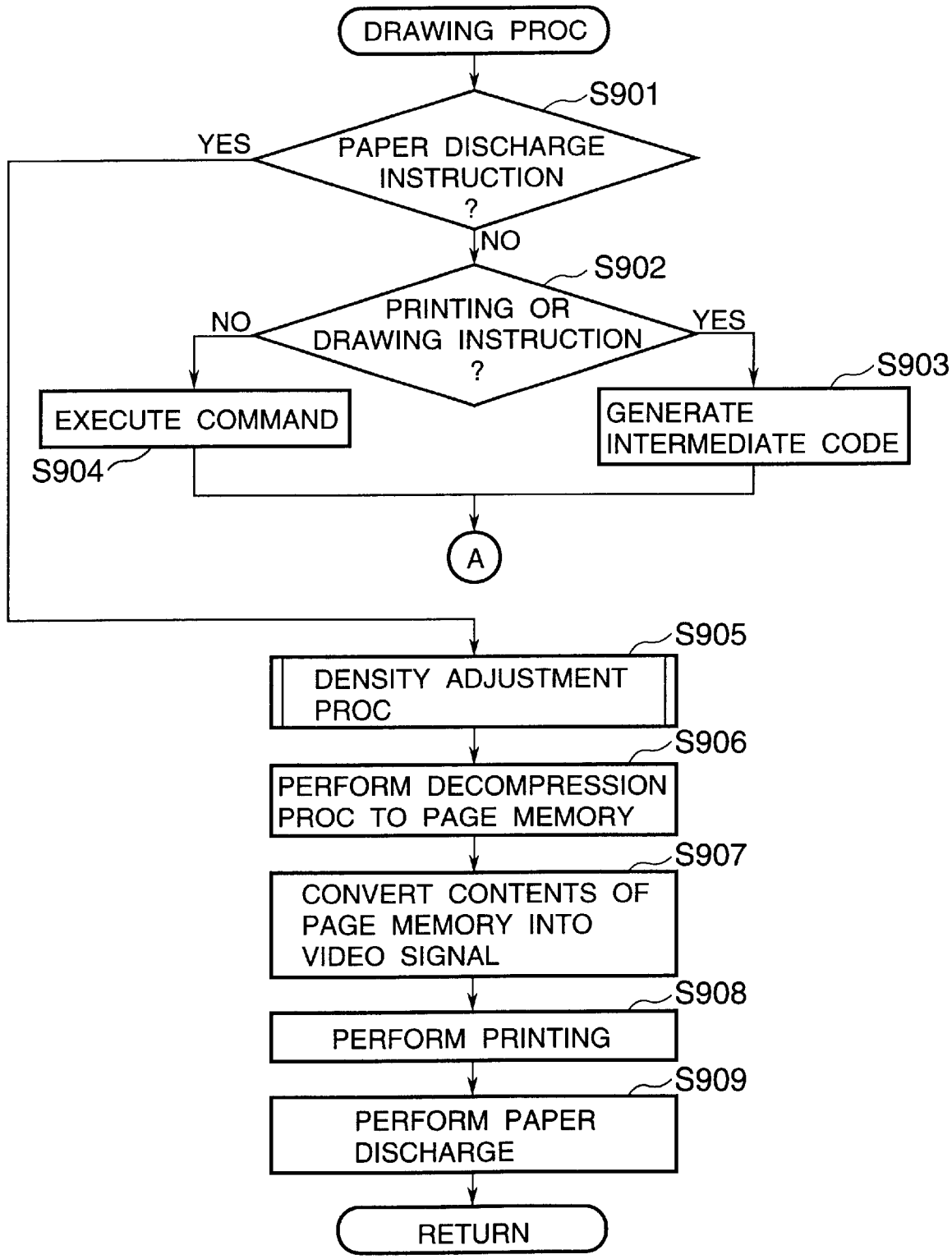
FIG. 9 is a flowchart showing a procedure of a drawing processing according to a second embodiment.
Figure 10:
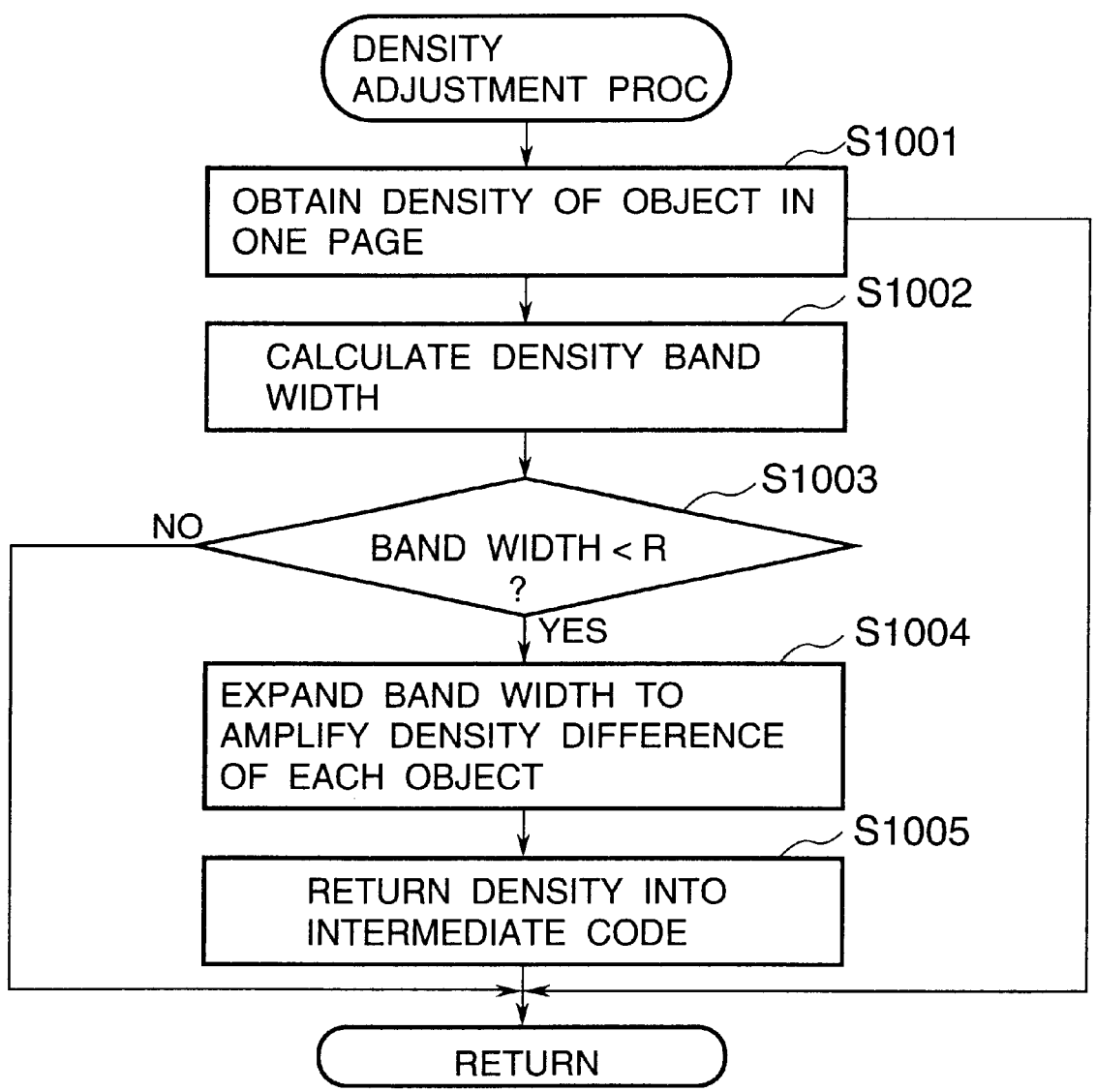
FIG. 10 is a flowchart showing a procedure of a density adjustment processing shown in FIG. 9.

In the first embodiment, the object adjacent to the object being generated is searched and a density difference is made, but in the second embodiment densities of all objects in the same page are searched to attain a density balance in the entire page. The processing procedure in the second embodiment is shown in FIGS. 9 and 10. Processing steps are shown in S901 to S909 in FIG. 9, and S1001 to S1005 in FIG. 10. Additionally, since the main processing of the printing apparatus is the same as the main processing of the first embodiment of FIG. 4, the description thereof is omitted. The following processings of the second to fourth and other embodiments are also stored as programs in the program ROM, and executed by the CPU 12.

FIG. 9 shows a drawing processing in the second embodiment. In the processing, a printing processing is actually performed. First at step S901, it is checked by the command analysis unit 1103 whether data indicates a paper discharge instruction. In response to the paper discharge instruction, the processing advances to step S905 to perform the processing. Moreover, when there is no paper discharge instruction in step S901, it is next determined whether the analyzed command indicates a printing or drawing instruction or another command for a depression processing to the page memory (step S902). If not, the processing advances to step S904 to immediately execute the command. When the processing advances to step S903 from S902, an intermediate code is generated in a form to facilitate the command execution processing. After the processing of steps S904, S905 is completed, the processing returns to the step S402 of FIG. 4 to repeat the data analysis processing.

On the other hand, when the processing advances to step S905 from S901, a density adjustment processing is performed in step S905. Subsequently, a decompression processing to the page memory is performed (step S906). Thereafter, the output control unit 1300 converts contents of the page memory 1105 into a video signal for the printer engine unit 1400 to transfer/output an image (step S907). The printer engine unit 1400 forms the received video signal to a permanent visible image on a recording sheet to perform printing (step S908). For a printed result, at step S909 paper discharge is performed, thereby completing the printing control processing per page.

FIG. 10 shows the density adjustment processing for use in FIG. 9. In the processing the object density of each page is adjusted. First at step S1001 objects in one page are searched to obtain a density (gray-scale converted value) of each object. Subsequently, in S1002, a density band width is calculated from a difference between maximum and minimum value of each obtained density (gray-scale converted value). For example, when the density (gray-scale converted value) of the object in one page has a maximum of 500 and a minimum of 100, the density band width is 400. When the calculated band width is equal to or more than a threshold value (R), the processing is ended as it is, but when the band width is less than the threshold value (R), the procedure advances to step S1004 to perform a processing (step S1003). At step S1004, the calculated band width is replaced with the threshold value (R), and the object density is re-calculated.

For example, when the calculated band width is 400, and the threshold value (R) is 500, the band width is replaced by 500. While the maximum of the object density in one page is set to 550, and the minimum thereof is set to 50, the densities of all objects are adjusted. After the re-calculated density of each object is returned into the intermediate code, the processing is ended (step S1005).

Concrete examples of printed results in the embodiment will next be described with reference to FIGS. 11, 12.

Figure 11:
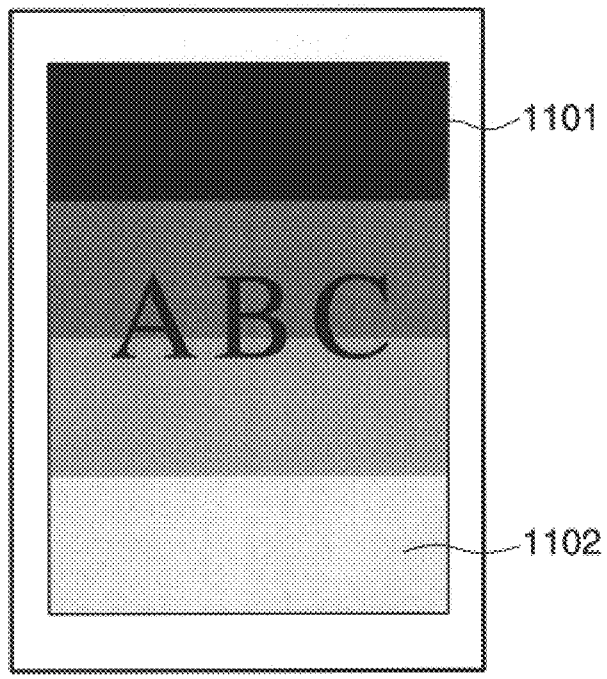
FIG. 11 is an explanatory view diagrammatically showing output results before and after density adjustment according to the second embodiment.
Figure 12:
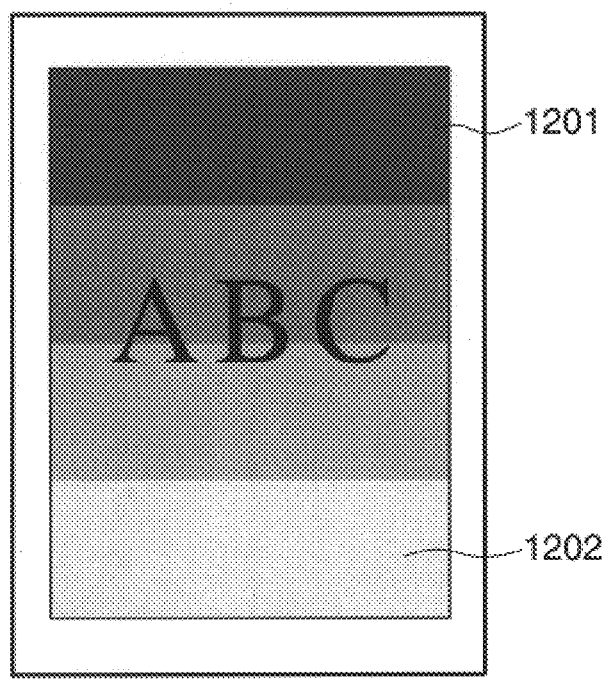
FIG. 12 is an explanatory view diagrammatically showing output results before and after density adjustment according to the second embodiment.

In FIGS. 11 and 12, the same printing data is received, but FIG. 11 diagrammatically shows a conventional printed results, and FIG. 12 shows a printed result according to the embodiment.

The density of portion 1201 is higher than that of portion 1101, and the density of portion 1202 is lower than that of portion 1102. Therefore, in FIG. 12, an entirely balanced beautiful printed result is obtained. Moreover, as the density band is expanded, the density difference of objects having similar densities is also expanded, so that the outline of the object can be emphasized. Additionally, the density adjustment processing in FIG. 10 may be performed only when there exist different-color objects in one page, converted to similar densities by gray-scale conversion.

Third Embodiment

In the first embodiment, the processing is performed by comparing the densities converted from RGB system, but some people can see the print more easily when the density of red is set higher than that of blue. To consider such individual difference, in the embodiment, a color element whose density is raised according to priority is selected from color elements R, G, B to perform a flexible density adjustment.

Figure 13:
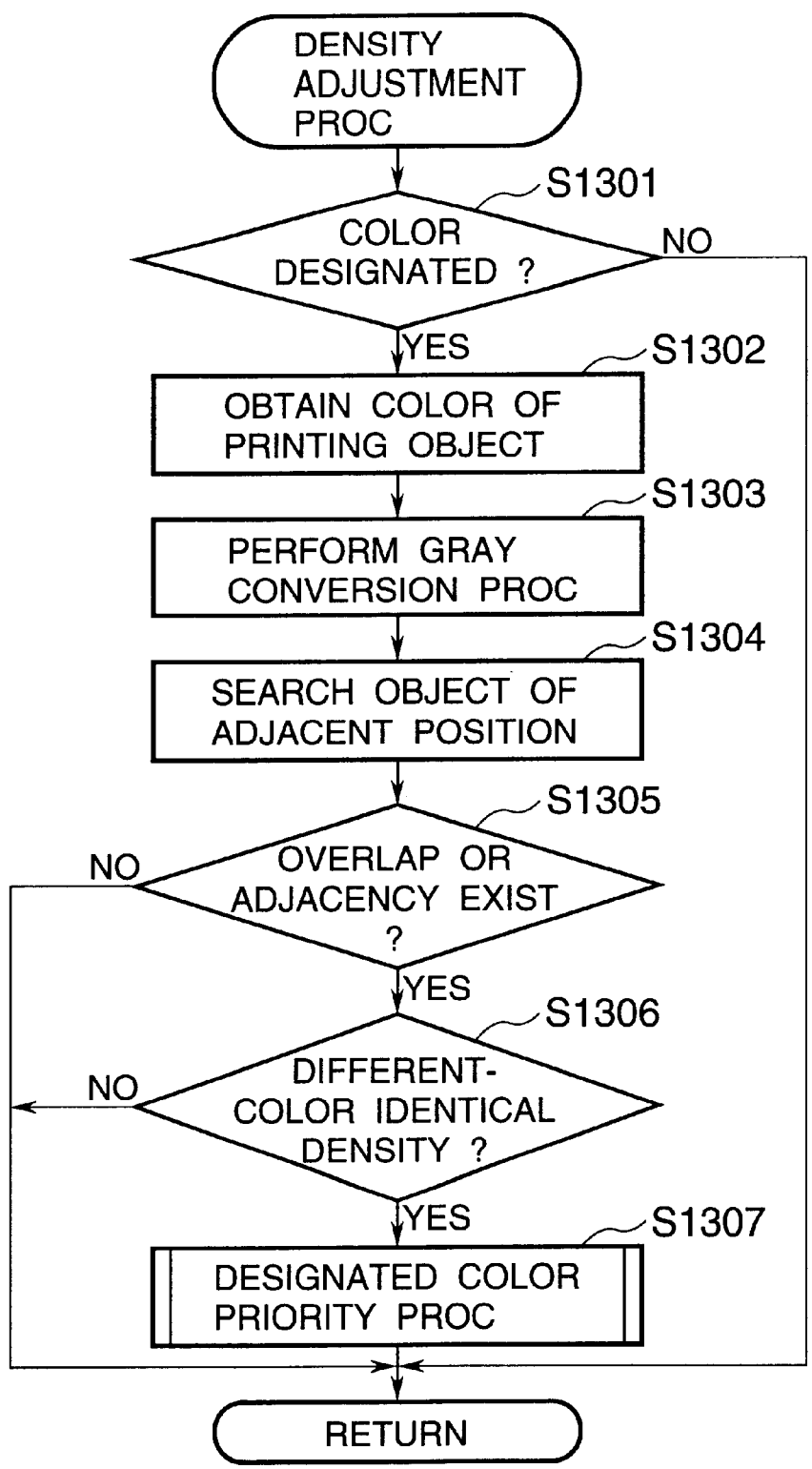
FIG. 13 is a flowchart showing a procedure of a density adjustment processing according to a third embodiment.
Figure 14:
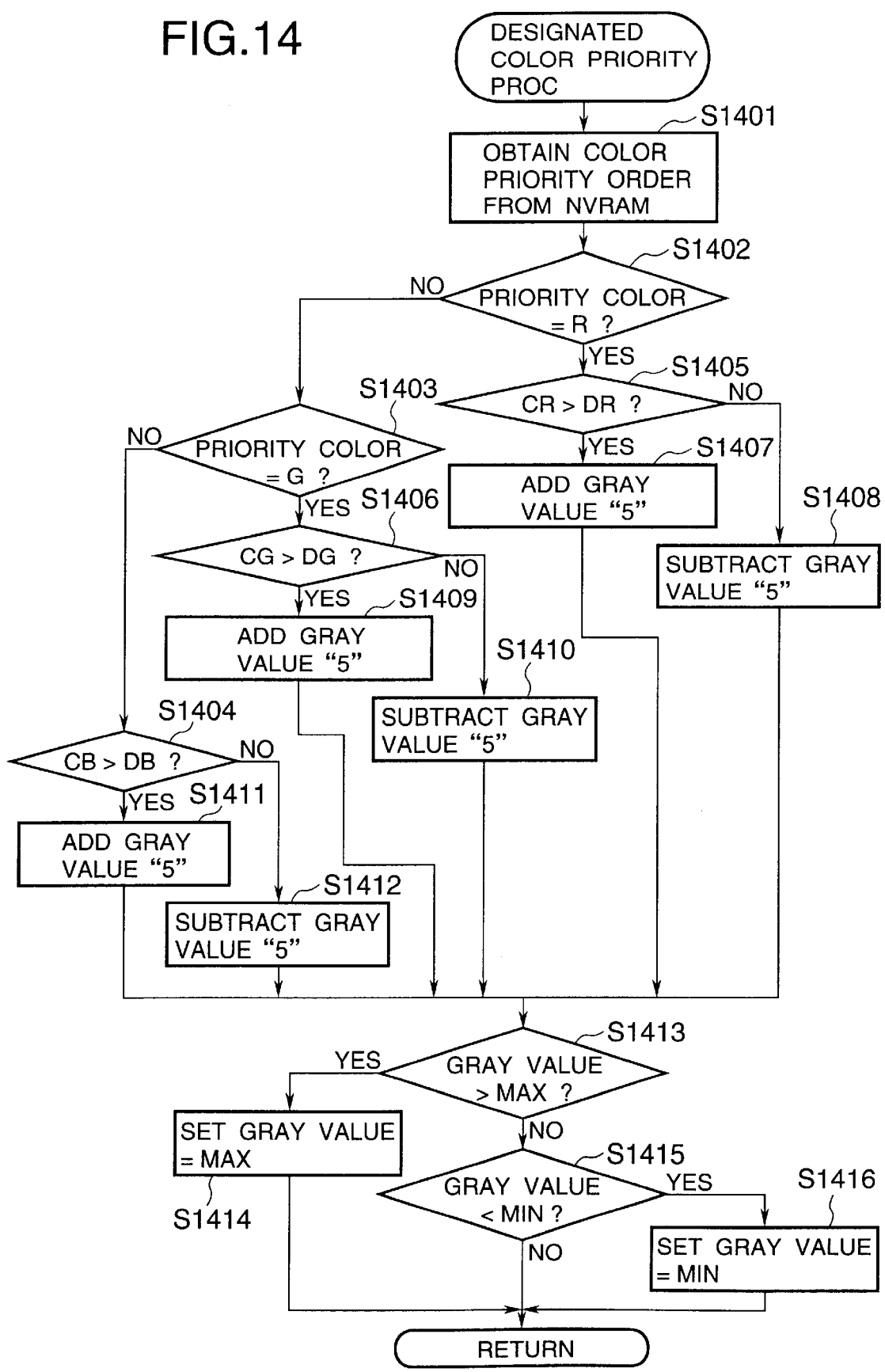
FIG. 14 is a flowchart showing a procedure of a designated color priority processing shown in FIG. 13.

The processing procedure of the embodiment is shown in FIGS. 13 and 14. Processing steps are shown as S1301 to S1307 in FIG. 13, and S1401 to S1416 in FIG. 14. Additionally, since the main printing processing and drawing processing are the same as those of the first embodiment of FIGS. 4 and 5, the description thereof is omitted.

FIG. 13 shows the density adjustment processing in the embodiment. In the processing a color designated in RGB system is converted to a gray density.

First it is judged at step S1301 whether or not color of a printing object is designated. When the color is not designated, the processing is completed as it is. In this case, an initial value or black (density of 100%) is selected as it is. When the color is designated at the step S1301, the designated color of the printing object is obtained at step S1302, and conversion to gray scale is performed at step S1303 (for details of the gray-scale conversion, refer to the first embodiment).

Subsequently, in step S1304, an object in a position adjacent to the object being processed is searched. Subsequently, it is determined in step S1305 whether or not an overlap or adjacency exists in each of the objects of the adjacent position searched in the step S1304. When there is any overlap or adjacency, it is further determined in step S1306 whether or not it has a different-color identical density. For the different-color identical density, the processing advances to step S1307 to perform a designated color priority processing. On the other hand, when there is no overlap or adjacency in step S1305, and there is no object with the different-color identical density in step S1306, the processing is ended as it is.

FIG. 14 shows contents of the designated color priority processing. In the processing the color designated in RGB system is converted to the gray density.

First at step S1401 color priority order is obtained from NVRAM in RAM 19. Here, NVRAM is a non-volatile memory, and any one of R, G, B is set as a priority color by designation from the console unit or panel 1012. When the priority color is not R, the processing advances to step S1403, and when it is R, the processing advances to step S1405 (step S1402). At step S1405 a value of R (CR) of the object being processed and a value of R (DR) of the adjacent object are compared. If CR is larger, "5" is added to the density of the object being processed (step S1407). If CR is smaller, "5" is subtracted from the density of the object being processed (step S1408).

On the other hand, when the priority color is not G in step S1403, the processing advances to step S1404, and when it is G, the processing advances to step S1406. At step S1406 a value of G (CG) of the object being processed and a value of G (DG) of the adjacent object are compared. If CG is larger,"5" is added to the density of the object being processed (step S1409). If CG is smaller, "5" is subtracted from the density of the object being processed (step S1410).

Furthermore, when the processing advances to S1404, the priority color is B. At step S1404 a value of B (CB) of the object being processed and a value of B (DB) of the adjacent object are compared. If CB is larger, "5" is added to the density of the object being processed (step S1411). If CR is smaller, "5" is subtracted from the density of the object being processed (step S1412). Thereafter, when the maximum value (i.e., black) is exceeded (step S1413), the gray value is set to the maximum value (step S1414). When the value is below the minimum value (i.e., white) (step S1415), the gray value is set to the minimum value (step S1416), thereby ending the processing.

Figure 15:
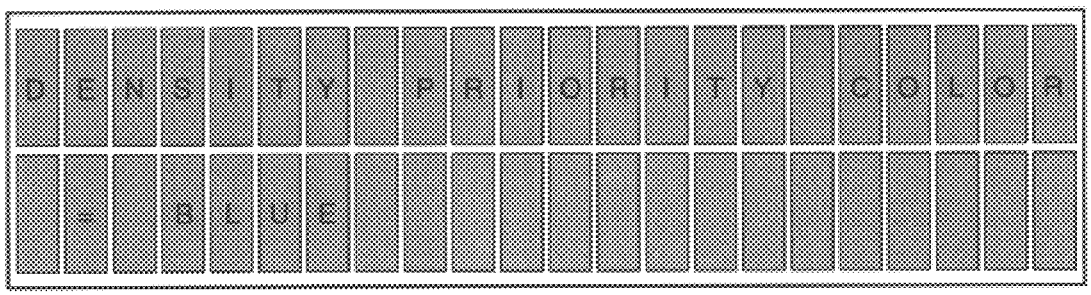
FIG. 15 is an explanatory view showing a display example of a console unit according to the third embodiment.

FIG. 15 shows a display example on the console unit 1012 when the priority color is set. In the example, B or blue is set as the priority color, and "B" is written into NVRAN.

Fourth Embodiment

Figure 16:
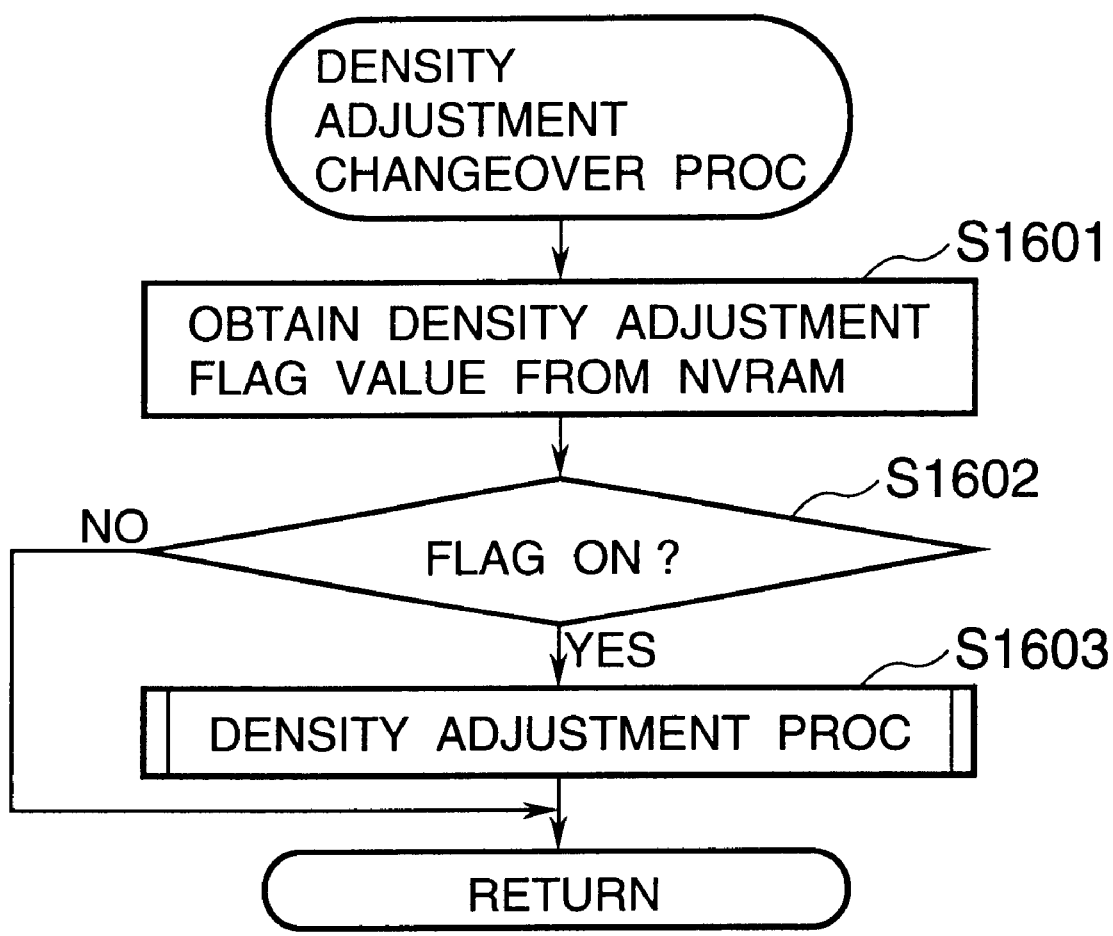
FIG. 16 is a flowchart showing a procedure of a density adjustment changeover processing according to a fourth embodiment.
Figure 17:
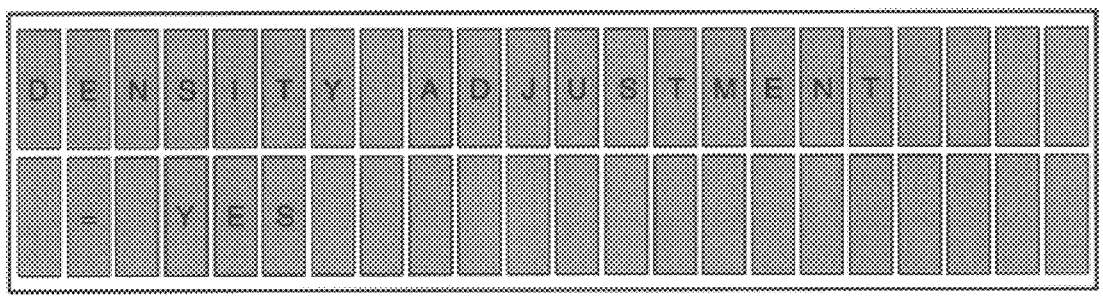
FIG. 17 shows a display example of an operation panel in the fourth embodiment.

In the first to third embodiments, the density adjustment is constantly automatically performed for the color of different-color identical density, but in the fourth embodiment there is further provided means capable of changing over the density adjustment processing by a user as desired. FIG. 16 shows a processing replacing the density adjustment processing corresponding to the step S509 of FIG. 5 and step S905 of FIG. 9, and a density adjustment changeover processing is shown. Processing steps are shown by S1601 to S1603 in FIG. 16. Additionally, since the processing before and after the present processing is the same as that of FIGS. 5 and 9, the description thereof is omitted. First at step S1401 a density adjustment flag value is obtained from NVRAM. Here, NVRAM is a non-volatile memory, and either "YES(=ON)" or "NO(=OFF)" is set by the designation from the panel. Subsequently in step S1602 the flag value is determined. When the density adjustment flag value is ON, in step S1603 a density adjustment processing is performed, and when it is OFF, the procedure is ended without performing the processing. Additionally, the density adjustment processing of step S1603 is the same as the density adjustment processing described with reference to FIG. 6 of the first embodiment, FIG. 10 of the second embodiment, and FIG. 13 of the third embodiment. Specifically, the fourth embodiment can be applied to any one of the first to third embodiments. FIG. 17 shows a display example on the console panel 1012 when the turning on/off of the density adjustment processing is set. To turn on the density adjustment processing "DENSITY ADJUSTMENT" is set to "YES", and to turn off the density adjustment processing "DENSITY ADJUSTMENT" is set to "NO". In the example, "DENSITY ADJUSTMENT=YES" is set, and ON is set to the density adjustment flag of NVRAM.

Fifth Embodiment

In the fourth embodiment the density adjustment processing can be turned on/off, while in the fifth embodiment the processings of the first and second embodiments are changed over.

Figure 18:
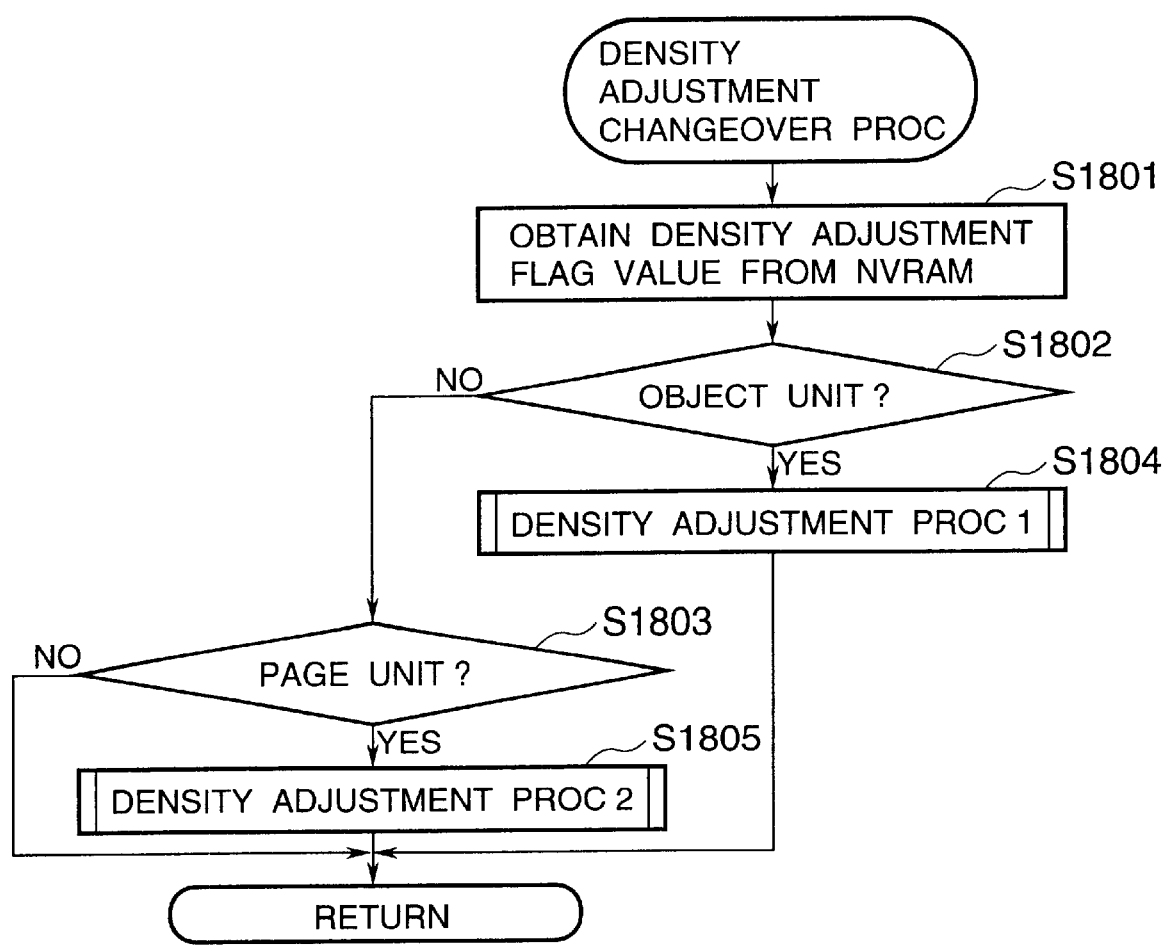
FIG. 18 is a flowchart showing a procedure of the density adjustment changeover processing according to a fifth embodiment.

FIG. 18 shows a processing replacing the density adjustment processing corresponding to the step S509 of FIG. 5 and step S905 of FIG. 9, and a density adjustment changeover processing is shown. Processing steps are shown by S1801 to S1805 in FIG. 18. Additionally, since the processing before and after the present processing is the same as that of FIGS. 5 and 9, the description thereof is omitted.

First at step S1801 a density adjustment flag value is obtained from NVRAM. Here, NVRAM is a non-volatile memory, and any one of "OBJECT UNIT (=2)", "PAGE UNIT (=1)" and "NO (=0)" is set by the designation from the panel. Subsequently in step S1802 the flag value is determined. When the density adjustment flag value is the object unit (=2), in step S1804 a density adjustment processing 1 is performed, and when it is not, the processing advances to step S1803 to further determine the flag value. In step S1803 when the density adjustment flag value is the page unit (=1), in step S1805 a density adjustment processing 2 is performed. On the other hand, in step S1803 when the density adjustment flag value is not the page unit, i.e., the density adjustment flag value is "NO (=0)", the processing is ended as it is. Additionally, the density adjustment processing 1 of step S1804 is the same as the density adjustment processing described with reference to FIG. 6 of the first embodiment. The density adjustment processing 2 of step S1805 is the same as the density adjustment processing described with reference to FIG. 10 of the second embodiment. Specifically, the fifth embodiment can be applied when the first and second embodiments are simultaneously implemented.

Figure 19:
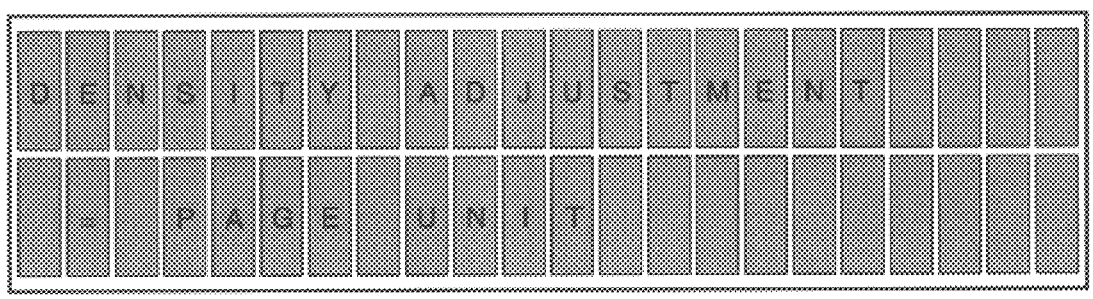
FIG. 19 shows a display example of the operation panel in the fifth embodiment.

FIG. 19 shows a display example on the console panel when the density adjustment processing is changed over. To perform the density adjustment processing of the second embodiment "DENSITY ADJUSTMENT" is set to "PAGE UNIT", and to perform the density adjustment processing of the first embodiment "DENSITY ADJUSTMENT" is set to "OBJECT UNIT". In the example, "DENSITY ADJUSTMENT=PAGE UNIT" is set, and 1 is set to the density adjustment flag of NVRAM.

Other Embodiments (1) In the first embodiment, the fixed value of 5 is added for the gray value adjustment, but the value may be set from the printing control command from the console unit 1012 or the host computer 3000. This can provide an output at a desired density.

(2) Moreover, in the first embodiment, the value after the density adjustment is adjusted, but adjustment may be performed with the value of RGB system to make a similar difference in density. In this method, the density adjustment can be performed not by the intermediate code, but by the printing control command analysis unit.

Furthermore, in the first embodiment, the density adjustment is performed only for the different-color identical density, but when the densities are not the same but very close to each other, i.e., when the difference of two data is within the range of threshold value, the similar processing may be performed.

(3) Further in the first embodiment, in a case where an object (e.g., diagram) has the same color as that of an object (diagram) subjected to the density adjustment, even if they are not adjacent to or do not overlap with each other, the density adjustment can be performed on all the same-color objects in one page. This can avoid a case where the same color is designated but a portion differs in density.

(4) In the second embodiment, the density adjustment processing is divided by the density band width, but there is a case where even when the density band width is equal to or less than the threshold value, the entire page is dark or pale. In this case, by calculating not only the density band width but also the average density or the density distribution, it can be checked whether the density is deviated in the density band width, or whether the density band itself is deviated to black or white.

(5) In the third embodiment, R, G, B is used in the priority color, but any other system (e.g., L*a*b or Luv) may be used as long as the color is designated.

(6) Moreover, in the third embodiment, the priority color is determined by the designation from the console unit 1012, but the color may be designated by the printing control command in accordance with an operator's instruction in the host computer 3000.

(7) In the aforementioned embodiments, the printing output has been illustrated, but the present invention can be applied even to the display output device.

(8) Examples of a method for notifying different-color identical density data in the display device include a method of changing the density by displaying one data in a flashing mode, or differentiating display colors.

(9) The object described in the aforementioned embodiments includes, in addition to the diagrams, characters, pictures, photographs and the like, to which the present invention can be applied.

(10) In the aforementioned embodiments, the density adjustment is performed on the side of the printing apparatus, but may be performed on the side of the host computer in such a manner that the gray-scale conversion result after the density adjustment is transferred to the printing apparatus.

Furthermore, in the fourth and fifth embodiments, the density adjustment processing changeover is determined by the designation from the operation panel, but may be set by the printing control command in accordance with the operator's instruction in the host computer 3000.

As described above, the different-color identical density data in which the image data values after gray-scale conversion are the same but colors are different is detected from the color image data and informed. Therefore, the user can know the presence of the different-color image data, and therefore perform, for example, changing of either one color image data or another processing.

Moreover, the gray-scale conversion result density with regard to the different-color identical density data is adjusted so as to vary with colors, and the adjusted gray-scale conversion result is outputted. Therefore, the user does not need to correct the color image data, and can distinguish, for example, a difference between two diagrams from a difference in output result density.

Furthermore, when the color image data value before the gray-scale conversion is changed, a specific color component can be emphasized by the image of the original color image data.

Additionally, the density adjustment is performed only when diagrams, or objects of characters, diagrams and the like are overlapped. Therefore, the density of another object is not changed, and the density balance of the entire image fails to be collapsed. Moreover, since the detection of the different-color identical density data is also limited to the overlapping objects, time required for the detection processing is short.

Furthermore, the overlapping portions can be identified by the density difference of the boundary portion or the density difference of the entire object.

Additionally, when there is no density difference in the gray-scale conversion result of the entire image, the density difference is expanded to clarify the different-color identical density object. Additionally, by balancing the entire density, the image quality of the output result is maintained.

Moreover, the problem of the different-color identical density printing in the monochromatic printing apparatus can be solved.

What is claimed is:

1. An image processing device, comprising:

processing means for obtaining color data and gray-scale converted value of a processing object and color data and gray-scale converted value of a processing object adjacent to said processing object;

first determining means for determining whether the gray-scale converted value of said processing object is similar to the gray-scale converted value of the processing object adjacent to said processing object;

second determining means for determining whether the color data of said processing object is different from the color data of the processing object adjacent to said processing object; and control means for, when said first, second determining means determines that the color data are different from each other and gray scales are similar to each other, control is performed to generate a difference in the gray-scale converted values of said processing object and the processing object adjacent to said processing object.

2. The image processing device according to claim 1, wherein the gray-scale converted value of said processing object and the gray-scale converted value of the processing object adjacent to said processing object are defined as commands of each processing object.

3. The image processing device according to claim 1, wherein the color data and the gray-scale converted value of said processing object are defined by the commands of said processing object and the color data and the gray-scale converted value of the processing object adjacent to said processing object are defined by the commands of the processing object adjacent to said processing object, and said commands are converted to an intermediate code, so that determination is performed by said determining means.

4. The image processing device according to claim 1, wherein the color data and the gray-scale converted value of said processing object and the color data and the gray-scale converted value of the processing object adjacent to said processing object are inputted from a host computer.

5. The image processing device according to claim 1, further comprising determining means for determining a presence/absence of the processing object adjacent to said processing object, wherein when there is no adjacent processing object, no control by said control means is performed.

6. The image processing device according to claim 1, said control means changes a method of generating the difference of said gray-scale converted value in accordance with user's designated color component data values of said processing object and the processing object adjacent to said processing object.

7. The image processing device according to claim 1, further comprising instructing means for changing over ON/OFF of the control by said control means.

8. The image processing device according to claim 1, wherein the color data and the gray-scale converted value of said processing object and the color data and the gray-scale converted value of the processing object adjacent to said processing object are inputted from a host computer, and the difference of said gray-scale converted value is inputted from said host computer.

9. The image processing device according to claim 1, wherein for a processing object having substantially the same color as that of the processing object adjacent to said processing object on the same page, said control means sets the same gray-scale converted value as that of the processing object adjacent to the processing object.

10. An image processing device, comprising:
   first processing means for obtaining gray-scale converted values of one page including a gray-scale converted value of a processing object;
   second processing means for calculating a density width of the gray-scale converted values of said one page;
   control means for expanding the density width of the gray-scale converted values of one page including the gray-scale converted value of said processing object in accordance with said density width; and
   determining means for determining a presence/absence of processing objects different in color and similar in gray-scale converted value in processing objects included in one page, wherein a processing by said control means is performed in accordance with a result of said determination.

11. An image processing method, comprising the steps of:
   performing processing to obtain color data and gray-scale converted value of a processing object and color data and gray-scale converted value of a processing object adjacent to said processing object;
   first determining whether the gray-scale converted value of said processing object is similar to the gray-scale converted value of the processing object adjacent to said processing object;
   second determining whether the color data of said processing object is different from the color data of the processing object adjacent to said processing object; and
   performing a control to, when it is determined by said first, second determining steps that the color data are different from each other and gray scales are similar to each other, generate a difference in the gray-scale converted values of said processing object and the processing object adjacent to said processing object.

12. The image processing method according to claim 11, wherein the gray-scale converted value of said processing object and the gray-scale converted value of the processing object adjacent to said processing object are defined as commands of each processing object.

13. The image processing method according to claim. 11, wherein the color data and the gray-scale converted value of said processing object are defined by the commands of said processing object and the color data and the gray-scale converted value of the processing object adjacent to said processing object are defined by the commands of the processing object adjacent to said processing object, and said commands are converted to an intermediate code, so that determination is performed by said determining steps.

14. The image processing method according to claim 11, wherein the color data and the gray-scale converted value of said processing object and the color data and the gray-scale converted value of the processing object adjacent to said processing object are inputted from a host computer.

15. The image processing method according to claim 11, further comprising the step of determining a presence/absence of the processing object adjacent to said processing object, wherein when there is no adjacent processing object, no control by said control step is performed.

16. The image processing method according to claim 11, in said control step a method of generating the difference of said gray-scale converted value is changed in accordance with user's designated color component data values of said processing object and the processing object adjacent to said processing object.

17. The image processing method according to claim 11, further comprising the step of giving an instruction to change over ON/OFF of the control by said control step.

18. The image processing method according to claim 11, wherein the color data and the gray-scale converted value of said processing object and the color data and the gray-scale converted value of the processing object adjacent to said processing object are inputted from a host computer, and the difference of said gray-scale converted value is inputted from said host computer.

19. The image processing method according to claim 11, wherein for a processing object having substantially the same color as that of the processing object adjacent to said processing object oh the same page, in said control step the same gray-scale converted value as that of the processing object adjacent to the processing object is set.

20. An image processing method, comprising the steps of:
   performing a first processing to obtain gray-scale converted values of one page including a gray-scale converted value of a processing object;
   performing a second processing to calculate a density width of the gray-scale converted values of said one page;

performing a control to expand the density width of the gray-scale converted values of one page including the gray-scale converted value of said processing object in accordance with said density width; and determining a presence/absence of processing objects different in color and similar in gray-scale converted value in processing objects included in one page, wherein a processing by said control step is performed in accordance with a result of said determining step.

21. A computer-readable storage medium capable of storing a program to achieve an image processing method, said method comprising:

performing processing to obtain color data and gray-scale converted value of a processing object and color data and gray-scale converted value of a processing object adjacent to said processing object;

first determining whether the gray-scale converted value of said processing object is similar to the gray-scale converted value of the processing object adjacent to said processing object;

second determining whether the color data of said processing object is different from the color data of the processing object adjacent to said processing object; and performing a control to, when it is determined by said first, second determining steps that the color data are different from each other and gray scales are similar to each other, generate a difference in the gray-scale converted values of said processing object and the processing object adjacent to said processing object.

* * * * *

UNITED STATES PATENT AND TRADEMARK OFFICE
CERTIFICATE OF CORRECTION

PATENT NO. : 6,473,521 B1
DATED : October 29, 2002
INVENTOR(S) : Yasuhiro Hino

It is certified that error appears in the above-identified patent and that said Letters Patent is hereby corrected as shown below:

Drawings,
Sheet 10, FIG. 10, "BAND WIDTH" (both occurrences) should read
-- BANDWIDTH --.

Column 2,
Line 2, "first," should read -- first and --; and
Line 3, "mines" should read -- mine --.

Column 5,
Line 54, "instruction,." should read -- instruction, --.

Column 6,
Line 23, "equation." should read -- equation: --; and
Line 43, "value." should read -- value --.

Column 8,
Lines 9, 14, 15, 19, 22 and 23, "band width" should read -- bandwidth --;
Line 11, "value" should read -- values --; and
Line 16, "band" should read -- band- --.

Column 11,
Lines 36 and 37, "band width" should read -- bandwidth --;
Line 39, "band" should read -- band- --; and
Line 42, "band width" should read -- bandwidth --; and "band" should read
-- bandwidth --.

Column 12,
Line 30, "be collapsed." should read -- collapse. --;
Line 61, "first," should read -- first and --; and
Line 62, "determines" should read -- determine --.

Column 13,
Line 23, "wherein" should read -- wherein, --; and
Line 26, "claim 1," should read -- claim 1, wherein --.

UNITED STATES PATENT AND TRADEMARK OFFICE
CERTIFICATE OF CORRECTION

PATENT NO. : 6,473,521 B1
DATED : October 29, 2002
INVENTOR(S) : Yasuhiro Hino

It is certified that error appears in the above-identified patent and that said Letters Patent is hereby corrected as shown below:

Column 14,
Line 11, "first," should read -- first and --;
Line 37, "wherein" should read -- wherein, --;
Line 39, "claim 11," should read -- claim 11, wherein --; and
Line 57, "oh" should read -- on --.

Column 16,
Line 10, "first," should read -- first and --.

Signed and Sealed this

Fourteenth Day of October, 2003

JAMES E. ROGAN
*Director of the United States Patent and Trademark Office*